United States Patent Office 3,337,495
Patented Aug. 22, 1967

3,337,495
STABILIZED POLYOLEFINS

John M. Corbett, Midland, Mich., and David A. Gordon, Scarsdale, N.Y., assignors to The Dow Chemical Company, Midland, Mich., a corporation of Delaware
No Drawing. Filed Nov. 18, 1963, Ser. No. 324,179
10 Claims. (Cl. 260—45.95)

This invention relates to new and improved polyolefin compositions which are stabilized against oxidation and color changes.

Polyolefins, such as polyethylene, polypropylene and the like, are commonly subjected to elevated temperatures in the course of their handling and processing into useful items of commerce. Such processing methods as rolling, injection molding, extrusion and the like at elevated temperatures usually result in oxidative degradation of the polymer. To minimize oxidative degradation in polyolefins, antioxidants or stabilizers are oftentimes incorporated therein. However, these stabilizers usually discolor the polyolefin composition and render the composition unsuitable for many processing applications. This is particularly the case with polyethylene and polypropylene, where color is often a critical factor.

It is known to the art for example, that phenolic compounds, particularly those having a substituted bisphenol structure, such as alkylidene-bis(alkyl phenol)s, are extremely effective antioxidants when incorporated into polyolefins such as polyethylene and polypropylene. The stabilizing efficiency of these compounds is synergistically increased when they are used in combination with auxiliary antioxidants such as a dialkyl ester of thiodipropionic acid. However, such phenolic stabilizing compositions when used singly or in combination with auxiliary antioxidants have the disadvantage of discoloring the olefin polymer upon incorporation, and the discoloration is rapidly intensified upon exposure to oxidative conditions.

In accordance with the present invention, both the oxidation and color stability of phenolic stabilized polyolefins are improved by the addition of a minor proportion of a polypentaerythritol to the stabilized polyolefin composition.

It is an object of this invention to provide polyolefin materials having improved oxidative stability.

Another object of this invention is to provide stabilized olefin polymers, particularly polyethylene and polypropylene, which are resistant to color deterioration and are stable against oxidation.

A further object is to provide such stabilized compositions which comprise phenolic stabilizers and which are resistant to color deterioration.

These and other objects are accomplished by incorporating into a polyolefin composition a small but effective amount, usually between about 0.01% and about 1.0% by weight, of a polypentaerythritol having the formula

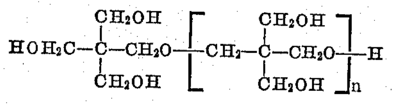

wherein *n* is an integer from 1 to 13.

Polypentaerythritols, as is known to those skilled in the art, are those alcohols which are higher derivatives of pentaerythritol and which are joined by etherification of one or more hydroxyl groups of pentaerythritol with other pentaerythritol residues. Polypentaerythritols include dipentaerythritol, tripentaerythritol, tetrapentaerythritol, pentapentaerythritol, heptapentaerythritol, octapentaerythritol, nonapentaerythritol, decapentaerythritol, similar polypentaerythritols and mixtures thereof.

The polypentaerythritols are prepared by any of the well-known procedures of the prior art. Such illustrative procedures are found in U.S. Patent Nos. 2,462,049 and 2,552,532.

In accordance with this invention, these polyols may be used singly or, often because of their commercial availability, in mixtures containing various amounts of at least two such polyols such as dipentaerythritol and tripentaerythritol.

The polypentaerythritols of the present invention are generally used in an amount between about 0.01% and about 1% by weight, based on the weight of the whole polyolefin composition. Preferably, the amount employed is between about 0.03% and about 0.2% by weight, especially in polyolefin compositions such as polyethylene and polypropylene.

The polypentaerythritols used in the practice of this invention are generally employed in conjunction with other known additives, such as phenolic antioxidants and heat stabilizers, and other known additaments generally used for polyolefin compositions.

The polypentaerythritol stabilizers can be incorporated or blended, along with other stabilizers, into polyolefin compositions by any of the conventional methods used for blending such materials into resins or plastics. Typical of such methods that can be suitably employed include milling on heated rolls, deposition from solvents, and dry blending. The polypentaerythritol can be incorporated separately or together with the other stabilizers into the polyolefin composition.

The phenolic compounds employed in the practice of the present invention are organic compounds which contain an aromatic radical and at least one hydroxy group linked to a carbon atom embraced in the nucleus of the aromatic radical. The phenolic compound may be monohydric or polyhydric, and one or more hydrogen atoms of the aromatic nucleus may be substituted by organic radicals. Representative phenolic stabilizers include butyl phenol, secondary butyl phenol, tertiary butyl phenol, amyl phenol, octyl phenol, nonyl phenol, decyl phenol, dodecyl phenol, octadecyl phenol, oleyl phenol, cardanol, 2,4-didodecyl phenol, 2,4-dibutyl phenol, 3,5-diamyl phenol, dinonyl phenol, didodecyl phenol, di-t-butyl-o-methyl phenol, di-t-butyl-p-methyl phenol, o-phenyl phenol, p-phenyl phenol, 2-methyl-4-tolyl phenol, 2,4-dimethyl-5-phenyl phenol, p-benzyl phenol, 2-t-butyl-m-cresol, o-t-butyl phenol, 2,6-di-t-butyl phenol, 2,6-diethyl phenol, 2,4,6-tri-t-butyl phenol, t-butyl-hydroquinone, 2,5-di-t-butylhydroquinone, o-octyl phenol, and tert-butylcatechol.

Preferred phenolic stabilizers are compounds having a substituted bisphenol structure such as the alkylidene-bis-(dialkylphenols) of which representative examples are 4,4′-cyclohexylidene-bis-(2-tert-butylphenol), 4,4′-isopropylidene-bis-(2-tert-butylphenol, and 4,4′-butylidene-bis- (6-tert-butyl-m-cresol); and the alkylidene-bis-(cycloalkylphenols) such as 4,4′-cyclohexylidene-bis-(2-cyclohexylphenol), 4,4′-sec-butylidene-bis-(2-cyclohexylphenol), 4,4′-(1-methylhexylidene)-bis-(2-cyclohexylphenol, 4,4′-cyclopentylidene-bis-(2-cyclohexylphenol), 4,4′-methylene-bis-(2-cyclohexylphenol), 4,4′-isopropylidene-bis-(2-cyclohexylphenol).

Auxiliary antioxidants which may be synergistic in function with the phenolic stabilizers such as the dialkyl esters of thiodipropionic acids may also be employed. Exemplary of these esters are the dimethyl, diethyl, dilauryl, etc., esters of thiodipropionic acid.

The olefin polymers employed in the practice of the present invention are any solid, high molecular weight polymers of olefins containing two or more carbon atoms. Exemplary of these polymers are polyethylene, polypropylene, poly(1-butene), poly(1-pentene), poly(3-methyl-1-butene), poly(4-methyl-1-pentene), polystyrene, etc. Copolymers of such olefins as, for example, ethylene-propylene, ethylene-butene, etc., may likewise be employed.

In order to more fully illustrate the invention, the following experimental data are given.

*Example I*

A quantity of about 500 grams of granular, essentially linear, polypropylene having a melt index of about 3 was stirred in an open container with about 200 ml. of a methylene chloride solution of the additive or additives to be tested. Stirring was continued until nearly all the methylene chloride was evaporated and the additive had been thoroughly dispersed through the polymer. The treated polypropylene was dried at 60° C. under nitrogen in a vacuum oven for about 4 hours. The additive (or mixture of additives) was then further mixed with the polymer by extrusion at about 250° C. The extruded plastic, after being converted into pellet form for handling, was then compression-molded at about 230° C. into 100 ml. thick samples. These test pieces were exposed in a circulating air oven at 150° C. and were examined periodically until the first signs of degradation were noted. This oxidative degradation appeared in the formation of spots of powdery disintegration of the solid structure and was associated with a slight darkening of the polymer. The time in hours to reach this point is referred to as the "oven-life" and where two figures are given in the following table for a particular composition, these are respectively the time of the last observation when the sample appeared unchanged and the time of the next observation when signs of degradation were first seen.

Some representative test results employing a phenolic compound exhibiting antioxidant activity are tabulated in Table I. The concentrations of additives is based on the weight of the polypropylene.

TABLE I

| Test No. | Additive | Oven-Life (hours) |
|---|---|---|
| A | None | <4 |
| B | 0.1% 4,4′-cyclohexylidene-bis-(2-cyclohexylphenol). | 80 |
| C | 0.5% dilauryl 3,3′-thiodipropionate (DLTDP). | 500 |
| D | 0.05% 4,4′-cyclohexylidene-bis-(2-cyclohexylphenol) 0.5% DLTDP. | 2,470–2,530 |

The procedure described above was repeated. This time samples of various stabilizer combinations with and without the addition of dipentaerythritol were used for comparative purposes. The color of the samples was observed periodically and rated according to a numerical scale. On this scale the higher the numerical color rating, the darker or more discolored the sample. For example, 1 is colorless, 7 is light tan, 12 is dark yellow tan. The results of the color evaluations are summarized by the data set out in Table II. In Table II CBCP is 4,4′-cyclohexylidene-bis-(2-cyclohexylphenol); DLTDP is dilauryl 3,3′-thiodipropionate; TLP is trilauryl phosphite; ZnSt is Zinc stearate; MgSt is magnesium stearate; and dipenta is dipentaerythritol.

TABLE II

| Test No. | Additives in Polypropylene (percent) | | | | | | Color Rating at 150° C. Oven Exposure (hours) | | | | | Oven-Life (hours) |
|---|---|---|---|---|---|---|---|---|---|---|---|---|
| | CBCP | DLTDP | TLP | ZnSt | MgSt | Dipenta | 0 | 20 | 100 | 200 | 300 | |
| 1 | 0.05 | 0.25 | | | | | 6 | 6 | 9 | 9 | 10 | 1,610–1,870 |
| 2 | 0.05 | 0.25 | | | | 0.025 | 1 | 1 | 2 | 3 | 3 | 1,610–1,870 |
| 3 | 0.05 | 0.25 | | | | 0.05 | 1 | 1 | 2 | 2 | 3 | 1,610–1,870 |
| 4 | 0.05 | 0.25 | | | | 0.10 | 1 | 1 | 2 | 3 | 3 | 1,300–1,320 |
| 5 | 0.05 | 0.25 | | | | 0.20 | 1 | 1 | 2 | 3 | 3 | 1,450–1,470 |
| 6 | 0.01 | | | | | | 3 | ND | ND | ND | ND | 0–20 |
| 7 | | 0.25 | | | | | 2 | 5 | 8 | 8 | ND | 280–300 |
| 8 | 0.01 | 0.25 | | | | | 3 | 5 | 7 | 8 | 9 | 1,300–1,420 |
| 9 | 0.01 | 0.25 | | | | 0.10 | 1 | 1 | 1 | 3 | 4 | 1,560–1,580 |
| 10 | 0.01 | 0.25 | 0.10 | | | | 3 | 6 | 8 | 9 | 10 | 1,560–1,580 |
| 11 | 0.01 | 0.25 | 0.10 | | | 0.10 | 1 | 1 | 2 | 3 | 4 | 1,600–1,660 |
| 12 | 0.01 | 0.25 | 0.05 | | | 0.05 | 1 | 1 | 1 | 3 | 4 | 1,520–1,540 |
| 13 | 0.01 | 0.25 | 0.10 | 0.10 | | | 1 | 2 | 5 | 6 | 8 | 1,100–1,120 |
| 14 | 0.01 | 0.25 | 0.10 | 0.03 | | 0.07 | 1 | 1 | 2 | 5 | 6 | 1,840–1,860 |
| 15 | 0.01 | 0.25 | 0.10 | 0.05 | 0.05 | | 2 | 2 | 7 | 7 | 8 | 1,820–1,840 |
| 16 | 0.01 | 0.25 | 0.10 | 0.02 | 0.02 | 0.06 | 1 | 1 | 1 | 2 | 2 | 1,560–1,580 |

ND=Not determined.

The data recorded in Table II show that the incorporation of dipentaerythritol into phenolic stabilized polypropylene compositions retards discoloration (test numbers 2, 3, 4, 5, 9, 11, 12, 14, 16) whereas equivalent stabilized polypropylene compositions which do not contain dipentaerythritol (test numbers 1, 6, 7, 8, 10, 13, 15) undergo substantial discoloration when exposed to oxidative conditions at 150° C. It will be noted that the presence of the dipentaerythritol does not materially affect the oxidative stabilizing effect of the antioxidants incorporated therein.

*Example II*

Stabilized test samples were prepared using the procedure of Example I wherein the base polymer was high density polyethylene. Color evaluation tests were conducted following the procedure of Example I, with the exception that the temperature of the circulating air oven was lowered to 100° C. The results of these tests are summarized in Table III below. In Table III CBCP is 4,4′-cyclohexylidene-bis(2-cyclohexylphenol); DLTDP is dilauryl 3,3′-thiodipropionate; dipenta is dipentaerythritol; and tripenta is tripentaerythritol.

TABLE III

| Test No. | Additives in Polyethylene (percent) | | | | Color Rating at 100° C. Oven Exposure (hours) | | | | |
|---|---|---|---|---|---|---|---|---|---|
| | CBCP | DLTDP | Dipenta | Tripenta | 0 | 20 | 125 | 250 | 500 |
| 1 | 0.05 | | | | 3 | 4 | 5 | 6 | 6 |
| 2 | 0.05 | | 0.05 | | 1− | 1 | 1 | 3 | 3 |
| 3 | 0.05 | | | 0.05 | 1− | 1− | 1 | 1 | 3 |
| 4 | 0.02 | 0.04 | | | 1 | 1 | 2 | 3 | 4 |
| 5 | 0.02 | 0.04 | 0.02 | | 1= | 1− | 1− | 1− | 1− |

NOTE.—1− is less than 1; 1= is much less than 1.

*Example III*

Stability and color deterioration evaluations were conducted with stabilizer modified polypropylene to which various polyhydric compounds were incorporated to demonstrate the unexpected efficacy of the polypentaerythritols. The procedure of Example I was repeated in the preparation of the test samples. Two stabilizer systems were evaluated. The first, designated as stabilizer System "A," was comprised of 0.05% CBCP, 0.50% DLTDP, 0.10% TLP, and 0.05% zinc stearate. The polyhydric compound was included in the polypropylene at a concentration of 0.05% based on the weight of the polymer. The second designated stabilizer System "B," was comprised of 0.05% CBCP and 0.25% DLTDP. The polyhydric compound was included in the polypropylene at a concentration of 0.10% based on the weight of the polymer. The results of the evaluation tests are summarized by the data set out in Table IV below.

TABLE IV

| Test No. | Stabilizer System | Polyhydric Additive | Color Rating at 150° C. Oven Exposure (hours) | | | | |
|---|---|---|---|---|---|---|---|
| | | | 0 | 20 | 100 | 200 | 300 |
| 1 | A | None (Control) | 1 | 3 | 5 | 9 | 9 |
| 2 | A | Dipentaerythritol | 1 | 1 | 1 | 6 | 7 |
| 3 | A | Pentaerythritol | 1 | 2 | 6 | 9 | 9 |
| 4 | A | Sorbitol | 1 | 1 | 5 | 8 | 9 |
| 5 | A | Mannitol | 3 | 5 | 6 | 8 | 9 |
| 6 | A | Polyvinyl alcohol | 4 | 6 | 10 | 11 | 20 |
| 7 | A | Diethylene glycol | 2 | 5 | 8 | 10 | 10 |
| 8 | A | Sorbitol Monostearate | 2 | 4 | 7 | 9 | 9 |
| 9 | A | Tartaric Acid | 6 | 10 | 10 | 10 | 10 |
| 10 | A | Citric Acid | 5 | 9 | 10 | 11 | 14 |
| 11 | A | Mandelic Acid | 4 | 7 | 20 | 20 | 20 |
| 12 | B | None (Control) | 4 | 4 | 8 | 8 | 9 |
| 13 | B | Dipentaerythritol | 1 | 3 | 3 | 3 | 4 |
| 14 | B | Sorbitol | 2 | 5 | 8 | 9 | 10 |
| 15 | B | Citric Acid | 6 | 9 | 10 | 10 | 10 |
| 16 | B | Diethylene glycol | 4 | 4 | 5 | 6 | 7 |
| 17 | B | Polybutylene glycol $[HO(C_4H_8O)_nC_4H_8OH]$ average molecular weight 500. | 3 | 4 | 6 | 6 | 7 |
| 18 | B | Neopentyl glycol | 4 | 4 | 6 | 6 | 7 |
| 19 | B | Pentaerythritol tetraacetate | 4 | 6 | 8 | 8 | 9 |

The data recorded in Table IV show that incorporation of dipentaerythritol in phenolic stabilized polypropylene (test numbers 2, 13) substantially retards the discoloration of the polymer when contrasted with polypropylene containing no color retardant additive (test numbers 1, 12) or other polyhydric compounds (test numbers 3–11, 14–19).

*Example IV*

Comparative evaluation tests were made with stabilizer System B of Example III, following similar procedures, with the exception that the polyhydric additives were incorporated in the polypropylene at a concentration of 0.10% based on the weight of polymer. The temperature of the circulating air oven was lowered to 100° C. The results of the evaluation tests are summarized by the data set out in Table V following.

TABLE V

| Test No. | Stabilizer System | Polyhydric Additive | Color Rating at 100° C. Oven Exposure (hours) | | | |
|---|---|---|---|---|---|---|
| | | | 0 | 250 | 500 | 1,000 |
| 1 | B | None (Control) | 4 | 7 | 9 | 10 |
| 2 | B | Dipentaerythritol | 1 | 1 | 3 | 3 |
| 3 | B | Sorbitol | 2 | 5 | 5 | 5 |
| 4 | B | Diethylene glycol | 4 | 5 | 6 | 9 |
| 5 | B | Pentaerythritol | 1 | 4 | 5 | 5 |
| 6 | B | Polyethylene glycol $[HO(C_2H_4O)_nC_2H_4OH]$ average molecular weight 400. | 1 | 5 | 6 | 10 |
| 7 | B | Polypropylene glycol $[HO(C_3H_6O)_nC_3H_6OH]$ average molecular weight 400. | 1 | 7 | 9 | 10 |
| 8 | B | Polypropylene glycol, average molecular weight 1200 | ----- | ----- | ----- | ----- |
| 9 | B | Polybutylene glycol $[HOC_4H_8O)_nC_4H_8OH]$ average molecular weight 500. | 3 | 5 | 7 | 8 |
| 10 | B | Neopentyl glycol | 4 | 5 | 6 | 8 |
| 11 | B | Pentaerythritol tetraacetate | 4 | 7 | 8 | 9 |
| 12 | B | Citric Acid | 6 | 8 | 8 | 9 |

The data recorded in Table V show that incorporation of dipentaerythritol in phenolic stabilized polypropylene (test number 2) substantially retards the discoloration of the polymer when contrasted with polypropylene containing no color retardant additive (test number 1) or other polyhydric compounds (test numbers 3–12).

*Example V*

Comparative coloration and oxidative stability evaluation tests were made using some bisphenol stabilizer systems. Polypropylene was employed as the base polymer and sample preparation and testing procedures were identical with Example I. The results of the evaluation tests are tabulated in Table VI following. DLTDP is dilauryl 3,3′-thiodipropionate.

TABLE VI

| Test No. | Stabilizer System | Color Rating at 150° C. Oven Exposure (hours) | | | | |
|---|---|---|---|---|---|---|
| | | 0 | 20 | 100 | 200 | 300 |
| 1 | (A) 0.05% 4,4′-isopropylidene-bis-(2-tert-butyl-phenol)+0.25% DLTDP. | 4 | 4 | 4 | 4 | 6 |
| 2 | (B) A+0.10% dipentaerythritol | 2 | 3 | 3 | 3 | 3 |
| 3 | (C) A+0.10% tripentaerythritol | 2 | 2 | 2 | 3 | 4 |
| 4 | (D) 0.05% 4,4′-butylidene-bis-(6-tert-butyl-m-cresol)+0.25% DLTDP. | 2 | 3 | 4 | 5 | 7 |
| 5 | (E) D+0.10% dipentaerythritol | 1 | 1 | 1 | 3 | 4 |
| 6 | (F) D+0.10% tripentaerythritol | 1 | 1 | 1 | 3 | 6 |
| 7 | (G) 0.05% proprietary phenolic condensation product ("Topanol" CA-Arnold Hoffman Co.)+0.25% DLTDP. | 3 | 5 | 9 | 10 | 10 |
| 8 | (H) G+0.10% dipentaerythritol | 1 | 1 | 2 | 3 | 4 |

NOTE.—Tests 1, 4, and 7 are not examples of the invention.

*Example VI*

Comparative coloration evaluation tests were made as in Example V, with the exception that the oven temperature was lowered to 100° C. The results of the evaluation tests are summarized in Table VII which follows. DLTDP is dilauryl 3,3′-thiodipropionate.

TABLE VII

| Test No. | Stabilizer System | Color Rating at 100° C. Oven Exposure (hours) | | | |
|---|---|---|---|---|---|
| | | 0 | 250 | 500 | 1,000 |
| (A) | 0.05% 4,4′-butylidene-bis-(6-tert-butyl-m-cresol)+0.25% DLTDP. | 2 | 5 | 5 | 5 |
| (B) | A+0.10% dipentaerythritol | 1 | 3 | 3 | 3 |
| (C) | A+0.10% tripentaerythritol | 1 | 1 | 2 | 3 |
| (D) | 0.05% proprietary phenolic condensation product ("Tropanol" CA-Arnold Hoffman Co.) +0.25% DLTDP. | 3 | 6 | 6 | 10 |
| (E) | D+0.10% dipentaerythritol | 1 | 2 | 3 | 4 |

NOTE.—Tests A and D are not examples of the invention.

*Example VII*

Stabilized test samples of polyethylene were prepared using the procedure of Example I. Color evaluation tests were conducted with 2,6-di-tert-butyl-p-cresol (DtBpC). The results of the evaluation tests are summarized in Table VIII.

In place of the polyolefins used in the foregoing examples, there can be used other polyolefins as hereinbefore described with similar results. Other polypentaerythritols can be used in polyolefins stabilized with other phenolic stabilizers as hereinbefore described with advantageous results in reducing color deterioration upon exposure to heat and/or oxygen.

What is claimed is:

1. A phenolic stabilized composition of a solid polymer of a mono-1-olefin having not more than eight carbon atoms containing a stablilizing amount of a phenolic antioxidant having at least one hydroxy group linked directly to the aromatic nucleus of an aromatic hydrocarbon as the only substituent of such hydrocarbon, which composition is predisposed to discolor upon exposure to oxidative conditions, and, as an agent improving the resistance of the phenolic-stabilized composition to color deterioration, from about 0.01% to about 1% by weight based on the composition of a polypentaerythritol having the formula:

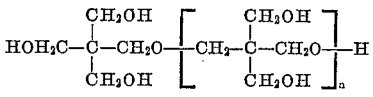

where $n$ is an integer from 1 to 13.

TABLE VIII

| Test No. | Stabilizer System | Color Rating at 100° C. Oven Exposure (hours) | | | | |
|---|---|---|---|---|---|---|
| | | 0 | 20 | 125 | 250 | 500 |
| 1 | 0.05% DtBpC | 6 | 7 | 7 | 7 | 7 |
| 2 | 0.05% DtBpC, 0.05% dipentaerythritol | 1= | 1− | 1− | 1− | 1− |
| 3 | 0.05% DtBpC, 0.05% tripentaerythritol | 1= | 1− | 1− | 1− | 1 |

NOTE.—1− is less than 1; 1= is much less than 1.

2. The composition of claim 1 in which the polymer is selected from the group consisting of polypropylene and polyethylene, the phenolic antioxidant is selected from the group consisting of 4,4'-cyclohexylidenebis (2-cyclohexylphenol), 4,4'-isopropylidenebis (2-tert.-butylphenol), 4,4'-butylidenebis (6-tert.-butyl-m-cresol), and 2,6-di-tert.-butyl-p-cresol, and the polypentaerythritol is selected from the group consisting of dipentaerythritol and tripentaerythritol.

3. The composition of claim 1 in which the polymer is polypropylene.

4. The composition of claim 1 in which the polymer is polyethylene.

5. The composition of claim 1 in which the polypentaerythritol is dipentaerythritol.

6. The composition of claim 1 in which the polypentaerythritol is tripentaerythritol.

7. The composition of claim 1 in which the polypentaerythritol is tetrapentaerythritol.

8. The composition of claim 1 wherein the phenolic antioxidant is 4,4'-cyclohexylidenebis (2-cyclohexylphenol).

9. The composition of claim 1 wherein the phenolic antioxidant is 4,4'-butylidenebis (6-tert-butyl-m-cresol).

10. The composition of claim 1 wherein the phenolic antioxidant is 2,6-di-tert.-butyl-p-cresol.

References Cited

UNITED STATES PATENTS

| | | | |
|---|---|---|---|
| 2,943,070 | 6/1960 | Hecker et al. | 260—45.95 |
| 2,985,617 | 5/1961 | Salyer et al. | 260—45.95 |
| 3,124,555 | 5/1964 | Brown et al. | 260—45.95 |
| 3,142,659 | 7/1964 | Buckley | 260—45.95 |

DONALD E. CZAJA, *Primary Examiner.*

LEON J. BERCOVITZ, *Examiner.*

H. E. TAYLOR, *Assistant Examiner.*